3,014,901
PROCESS FOR PREPARING UNGELATINIZED
STARCH ETHERS
Lowell O. Gill, Decatur, and John A. Wagoner, Mount
Zion, Ill., assignors to S. A. E. Staley Manufacturing
Company, Decatur, Ill., a corporation of Delaware
No Drawing. Filed Aug. 5, 1959, Ser. No. 831,690
1 Claim. (Cl. 260—233.3)

This invention relates to new starch products and to methods of preparation thereof. More specifically, it relates to the preparation of ungelatinized starch ethers in original granule form which contain substantially larger proportions of ether substituents than can be introduced into native starch by reaction in a water slurry.

Ungelatinized starch derivatives may be divided into two classes differing as to the effect of increasing degree of substitution on the gelatinization temperature and the hot paste viscosity. The two classes are (1) those in which the effect is to increase the hot paste viscosity at low degrees of substitution, to decrease the hot paste viscosity at intermediate degrees of substitution, and ultimately yield a product which will not gelatinize in water at 95° C., and (2) those in which the effect at low degrees of substitution is to lower the gelatinization temperature without substantially changing the hot paste viscosity, and the effect at high degrees of substitution is often to increase the gelatinization temperature, reduce the hot paste viscosity and ultimately to yield a product which also will not paste in water at 95° C.

Members of the first group, particularly those which do not gelatinize in hot water, are referred to as inhibited starches. The term "inhibited" as applied to starches, has acquired both broad and narrow meanings in starch technology. In a narrow sense, an inhibited starch is one which will not gelatinize in aqueous media under conditions which cause gelatinization of the parent or uninhibited starch. In a broader sense, an inhibited starch is one in which the disintegration of the granules in aqueous media under gelatinization conditions is retarded by comparison with the behavior of the parent starch under the same conditions. A slightly inhibited starch will gelatinize or paste in hot water. Thus, the enhanced hot paste viscosity of lightly inhibited starches is due to the fact that the granules, which are still able to swell greatly by imbibing water, have a tougher, stronger structure and remain intact instead of disintegrating. It is well known that starch pastes consisting of intact highly distended granules exhibit unusually high viscosity per unit concentration of starch dry substance, and that rupture or disintegration of the swollen granules by high temperature cooking or vigorous mechanical agitation reduces the paste viscosity.

The lowered gelatinization temperature of the second group of starch derivatives, as noted above, frequently bars the preparation of the derivatives by reaction between reagent and starch in a simple water slurry because the desired product gelatinizes in cold water. For example, ungelatinized hydroxyethyl starch containing more than 4% by weight of hydroxyethyl group cannot be prepared in water slurry because the starch granules swell and paste during the process. Alternative methods of preparing the desired products are generally more expensive. Among such methods are (1) reacting dry starch with the appropriate reagent and catalyst, (2) replacing the water in the simple water slurry method with a liquid, preferably one miscible with water, in which starch is non-gelatinizable, and (3) adding a gelatinization inhibitor, such as sodium sulfate or dextrose, to the water in the simple water slurry method.

An important object of the present invention is to provide a general method for preparing modified starch derivatives of the foregoing second group which gelatinize in hot water, but not in cold water, and which, in the absence of their modification, would gelatinize in cold water.

Another object of the invention is to provide a method based on simple water slurry technique for preparing the starch derivatives referred to in the above statement of invention object.

Still another object of the invention is to provide new compositions of matter consisting of ungelatinized starch derivatives containing more than one chemical substituent which gelatinize in hot water but not in cold water.

Additional objects of the invention will appear in the following description of the invention.

The foregoing objects are achieved in accordance with the present invention by reacting ungelatinized starch first with a reagent to impart a desired degree of inhibition and second with another reagent to introduce the desired kind and proportion of chief constituent. The inhibition produced by the first step is controlled to yield a product which does not gelatinize in hot water, but which will gelatinize therein (but not in cold water) after reaction with the selected reagent in the second step.

Our invention is particularly useful in the preparation of highly substituted starch ethers which normally gelatinize in water at or below about 45° C. Heretofore, one could not prepare such derivatives by reaction between starch and reagent in a simple water slurry because the product would paste during the process. As pointed out earlier, our invention makes it possible to use the convenient and inexpensive water slurry technique in preparing the highly substituted derivatives.

For example, if it is desired to make a highly substituted ungelatinized hydroxyethyl starch to be used as a low B.O.D. textile size by conventional methods, one must resort to one of the less convenient and more expensive alternatives mentioned earlier. Our invention provides a substantial economic advantage in this particular instance.

Our invention provides similar advantages over the prior art with respect to the preparation of other highly substituted starch ethers which normally gelatinize in cold water alone, i.e., in water at about 45° C. or less. Examples of these are the methyl ether and the carboxymethyl ether of starch.

Our invention is applicable to ungelatinized starches generally. That is, the parent starch may be derived from the root, stem, or fruit of a plant, and it may have been previously modified by known chemical and physical methods. Among the latter are mild oxidation with permanganate and with alkaline hypochlorite, mild treatment with acids, reaction with chlorine in acid solution, and exposure to heat (i.e., dextrinization) in the presence or absence of catalysts.

As pointed out earlier, the two main process features of our invention are (1) reaction of an ungelatinized parent starch with a reagent to yield an inhibited starch which does not gelatinize in water at 95° C. and (2) reaction of the inhibited starch with a second reagent to introduce the desired kind and amount of substituent and, at the same time, make the derivative gelatinizable in water at a temperature lying within the range of about 45° C.–95° C., preferably 65° C.–75° C. Obviously, in view of the foregoing discussion, processing conditions required to obtain a derivative having the desired kind and amount of principal substituent will be influenced by the kind of parent starch, the kind of inhibiting reagent used, and the kind of principal substituent.

Numerous methods for the preparation of inhibited starches are available. According to United States Patent 2,500,950, an inhibited starch may be produced by chemically reacting the ungelatinized starch with a bifunctional ether-forming reagent, one that forms ether linkages with two hydroxyl groups of the starch. Suitable reagents for this purpose are ether forming aliphatic dihalides such as ethylene dibromide and epoxy halides such as epichlorohydrin.

Another convenient method of preparing inhibited starches is described in United States Patent 2,524,000. The granular ungelatinized starch is reacted with a small proportion of divinylsulfone in the presence of an alkaline catalyst. A third method is found in United States Patent 2,407,071 (cf. lines 14–18, right hand column, page 1), a method based on reacting the ungelatinized starch with a water soluble resin-forming material such as dimethylol urea in the presence of an acid catalyst. United States Patent 982,673 teaches a fourth method, namely, steeping the ungelatinized starch at 20° C.–30° C. in an aqueous solution of formaldehyde and ammonium chloride. Other methods will appear in the following examples.

Example 1

This example illustrates the preparation of an inhibited corn starch by treating it with epichlorohydrin in an alkaline aqueous medium. 2000 grams of starch (10% moisture) are slurried with 3000 grams of cold water, 30 grams of 50% sodium hydroxide solution and 10 grams of epichlorohydrin. The slurry is stirred gently at 25–30° C. for 120 hours. It is then neutralized to 5.5 pH with concentrated hydrochloric acid. The neutralized slurry is filtered and the filter cake of ungelatinized starch granules is washed on the filter with cold water and then dried at room temperature. The dried starch resembles the original starch superficially, but it does not form a paste in 12 parts of water at 95° C. The granules swell slightly in the hot water but rapidly settle out on standing.

Example 2

This example illustrates the preparation of another inhibited corn starch by treating the starch with a smaller proportion of epichlorohydrin than that used in Example 1. Example 1 is repeated in all details except that the amount of epichlorohydrin is reduced to 2 grams and the stirring time is reduced to 24 hours. The dried reaction product again resembles the original starch superficially, but it does not form a paste in 12 parts of water at 95° C. The granules swell in the hot water somewhat more than those of Example 1, but they also settle out of the suspension on standing.

Example 3

This example illustrates the preparation of an inhibited corn starch by treating it with dimethylol urea in an acidic aqueous medium. 534 grams of corn starch (10% moisture) are slurried with 960 grams of cold water, 100 grams of a 40% aqueous solution of dimethylol urea and enough concentrated hydrochloric acid to adjust the pH of the slurry to 4. The slurry is warmed to 50° C. and stirred gently at that temperature for 2 hours. It is then neutralized to 7 pH with soda ash solution and filtered. The filter cake is washed on the filter with cold water and dried at room temperature. The dried starch resembles the original starch superficially, but it does not form a paste in 12 parts of water at 95° C. The granules swell to a moderate extent in the hot water but settle out of the suspension on standing.

Example 4

This example illustrates the preparation of an inhibited corn starch by treating it with acrylonitrile in an alkaline aqueous medium. 360 grams of corn starch (10% moisture) are slurried with 1000 mls. of cold 6N sodium carbonate solution and 22.5 mls. of acrylonitrile. The slurry is stirred gently for 48 hours at 25–30° C. It is then filtered and the filter cake is re-suspended in 10 parts by weight of water. The suspension is neutralized to 5 pH with concentrated hydrochloric acid and filtered. The filter cake is washed on the filter with cold water and dried at room temperature. The behavior of this starch in 12 parts of water at 95° C. is about the same as that of the starch in Example 3.

Example 5

This example illustrates the preparation of an inhibited corn starch by reacting it with more acrylonitrile than is used in Example 4. Example 4 is repeated in all details except that the quantity of acrylonitrile is doubled. The inhibited starch does not form a paste in 12 parts of water at 95° C. The granules swell even less in the hot water than those of the starch prepared according to Example 4.

Example 6

This example illustrates the preparation of an inhibited corn starch by treating it with divinylsulfone in an alkaline aqueous medium. 450 grams of corn starch (10% moisture) are slurried with 600 grams of cold water, 100 grams of a 4% sodium hydroxide solution and 9 grams of divinylsulfone. The slurry is stirred gently for 1 hour at 25° C. It is then neutralized to 6 pH with concentrated hydrochloric acid and filtered. The filter cake is washed on the filter with cold water and dried at room temperature. The behavior of this inhibited starch in 12 parts of water at 95° C. resembles that of the starch prepared in Example 1.

Example 7

This example illustrates the preparation of an inhibited corn starch by treating it with acrolein in an alkaline aqueous medium. 500 grams of corn starch (10% moisture) are slurried with 625 grams of cold water, 100 grams of a 4% sodium hydroxide solution and 2.5 grams of acrolein. The slurry is stirred gently for 2 hours at 25° C. It is then neutralized to 6 pH with concentrated hydrochloric acid and filtered. The filter cake is washed on the filter with cold water and dried at room temperature. The behavior of this inhibited starch in water at 95° C. resembles that of the starch prepared in Example 1.

Example 8

This example illustrates our invention with respect to the hydroxyethyl ether of starch. An epichlorohydrin inhibited corn starch is modified by reaction with enough ethylene oxide to make the final product gelatinizable in hot water but not in cold water. 500 grams of starch prepared according to Example 2 are slurried with 700 grams of cold water, 100 grams of a 4% sodium hydroxide solution and 10 grams of sodium chloride. The slurry is placed in a closed and jacketed mixing device which is adapted to withstand either vacuum or internal superatmospheric pressure. Water at 30° C. is circulated through the jacket and the closed mixer is evacuated to a pressure of about 2 pounds per square inch gage. Next, 62 grams of ethylene oxide are admitted from a cylinder of the liquefied reagent over a two-hour period. The starch slurry is stirred during this addition period and the temperature of the slurry is maintained at 25–30° C. by means of cooling water circulated through the jacket. After all of the ethylene oxide is added, stirring is continued for 22 hours at an average temperature of about 27° C. The slurry is then withdrawn from the mixer, neutralized to 6 pH with hydrochloric acid and filtered. The filter cake is washed on the filter with cold water and dried at room temperature. The product contains 6.45% of added ethylene oxide. The calculated degree of hydroxyethyl substitution is 0.24. The product forms a smooth thick paste when heated with 12 parts of water at 95° C. The product is useful generally as a gelatinizable starch in the adhesive, textile sizing, and paper coating fields.

Example 9

This example is similar to Example 8 but is based on reacting a more highly inhibited corn starch with a higher proportion of ethylene oxide. 470 grams of starch prepared according to Example 1 are slurried with 660 grams of cold water, 100 grams of a 4% sodium hydroxide solution and 10 grams of sodium chloride. The slurry is placed in a closed and jacketed mixing device which is evacuated to a pressure of 2 pounds per square inch gage. The temperature of the slurry in the mixer is brought to 25° C. by circulating cooling water through the jacket and 61 grams of ethylene oxide are admitted to the mixer over a period of two and one-half hours. During this period, the slurry is stirred constantly and its temperature is maintained at about 25° C. Stirring is continued for 21½ hours after the ethylene oxide addition. A second quantity of ethylene oxide (66 grams) is then added as before and stirring is continued at 25–30° C. thereafter for about 48 hours. The slurry is removed from the mixer, neutralized to 5.5 pH with concentrated hydrochloric acid and filtered. The filter cake is washed on the filter with cold water and dried at room temperature. The dried starch contains 12.3% of added ethylene oxide. The calculated degree of hydroxyethyl substitution is 0.52. The product forms a smooth paste in 12 parts of water at 95° C. The viscosity of the paste is somewhat less than that of the corresponding paste of the starch prepared in Example 8. The pasted product is useful as a textile size. Furthermore, its B.O.D., on a starch solids basis, is only 22% of that of the pasted original corn starch.

*Example 10*

This example illustrates the modification of a corn starch inhibited with dimethylol urea by reaction with ethylene oxide. 300 grams of starch prepared according to Example 3 are slurried with 400 grams of cold water, 60 grams of a 4% sodium hydroxide solution and 10 grams of sodium chloride. The slurry is placed in a closed and jacketed mixer and its temperature is brought to 24° C. by circulating cooling water through the jacket. After the mixer is evacuated to a pressure of about 2 pounds per square inch gage, 18 grams of ethylene oxide are admitted from a cylinder over a period of about 1 hour. During this period the slurry is stirred continuously and its temperature is maintained at about 25° C. Stirring is continued for 16 hours after all the ethylene oxide is added. Another quantity (10 grams) of ethylene oxide is added and stirring is continued for 24 hours at the same temperature. The slurry is removed from the mixer, neutralized to 5.5 pH with concentrated hydrochloric acid and filtered. The filter cake is washed on the filter with cold water and dried at room temperature. The dried starch contains 5.02% added ethylene oxide for a calculated degree of hydroxyethyl substitution of 0.2. The product forms a thick smooth paste when heated with 12 parts of water at 95° C. It is also useful generally as a gelatinizable starch in the adhesive, paper coating, and textile sizing fields.

*Example 11*

This example illustrates the modification of a corn starch inhibited with acrylonitrile. 500 grams of starch prepared according to Example 5 are slurried with 700 grams of cold water, 100 grams of a 4% sodium hydroxide solution and 10 grams of sodium chloride. The slurry is placed in a closed and jacketed stirring device. Its temperature is brought to 25° C. by circulating cooling water through the jacket. During continuous stirring and at a temperature of about 25° C., 62 grams of ethylene oxide are admitted to the mixer from a cylinder over a two-hour period. Stirring is continued for 22 hours thereafter at the same temperature. The reaction slurry is removed from the mixer, neutralized to 6 pH with concentrated hydrochloric acid and filtered. The filter cake is washed on the filter with cold water and dried at room temperature. The dried starch contains 6.2% of added ethylene oxide. The calculated degree of hydroxyethyl substitution is 0.23. The starch forms a thick smooth paste when heated with 12 parts of water at 95° C. Its utility is broadly the same as that of the products made according to Examples 8, 9, and 10.

*Example 12*

This example illustrates the modification of another acrylonitrile inhibited corn starch. 500 grams of starch prepared according to Example 4 are slurried with 700 grams of cold water, 100 grams of a 4% sodium hydroxide solution and 10 grams of sodium chloride. The slurry is placed in a closed and jacketed stirring device which is then evacuated to a pressure of about 2 pounds per square inch gage. The slurry temperature is brought to about 28° C. by circulating cooling water through the jacket. 40 grams of ethylene oxide are then added from a cylinder to the mixer over a period of about one hour. During this addition period, the slurry is stirred continuously and its temperature is maintained at about 28° C. Stirring is continued thereafter for 23 hours at a temperature ranging from 25–30° C. The reaction slurry is removed from the mixer, adjusted to about 6 pH with concentrated hydrochloric acid and filtered. The filter cake is washed on the filter with cold water and dried at room temperature. The dried starch contains 4.2% added ethylene oxide. The calculated degree of hydroxyethyl substitution is 0.17. The product forms a smooth, viscous paste when heated with 12 parts of water at 95° C. The hot paste viscosity is somewhat greater that that of the corresponding paste of the product made in Example 11. The product is useful as a gelatinizable starch in the adhesive, paper coating, and textile sizing fields.

*Example 13*

This example illustrates the modification of a corn starch inhibited with divinylsulfone by reacting the starch with ethylene oxide. Example 9 is repeated in all respects except that the 470 grams of starch prepared according to Example 1 are replaced with 470 grams of starch prepared according to Example 6. The dried reaction product forms a smooth viscous paste in 12 parts of water at 95° C. It contains 12.1% of added ethylene oxide. The calculated degree of hydroxyethyl substitution is 0.51. The gelatinized product is particularly useful as a low B.O.D. textile size.

*Example 14*

This example illustrates the modification of an acrolein inhibited corn starch by reacting it with ethylene oxide. Example 9 is repeated in all respects except that the 470 grams of starch prepared according to Example 1 are replaced with 470 grams of starch prepared according to Example 7. The dried reaction product contains 12.0% of added ethylene oxide. The calculated degree of substitution is 0.51. The product forms a smooth viscous paste in 12 parts of water at 95° C. This product, in gelatinized form, is also useful as a low B.O.D. textile size.

*Example 15*

This example illustrates our invention with respect to the carboxymethyl ether of starch. 500 grams of starch prepared according to Example 1 are slurried with 650 grams of cold water, 100 grams monochloroacetic acid and 80 grams of a 50% sodium hydroxide solution. The temperature of the slurry is adjusted to 30° C. and a 25% sodium hydroxide solution is added with stirring to maintain the pH of the slurry between 12 and 13. The 25% sodium hydroxide solution is added as required until the pH no longer drops with continued stirring after each addition. The time required to reach this point is about 36 hours. The slurry is neutralized to 4.5 pH with concentrated hydrochloric acid and filtered. The filter cake is washed on the filter with cold water and dried at room temperature. The dried starch contains 3.8% of added acetic acid. The calculated degree of carboxymethyl substitution is 0.14. The product forms a clear viscous paste in 15 parts of water at 95° C. It is broadly useful as a gelatinizable starch in the adhesive, paper coating, and textile sizing fields.

*Example 16*

This example illustrates our invention with respect to the methyl ether of starch. 500 grams of starch prepared according to Example 1 are slurried with 700 grams of cold water, 190 grams of methyl bromide and enough 25% sodium hydroxide solution to adjust the pH of the slurry between 12 and 13. The temperature of the slurry is maintained at 30° C. and 25% sodium hydroxide solution is added as required until there is no appreciable drop in pH on continued stirring and after the last addition of sodium hydroxide. The time required to reach this point is about 72 hours. The slurry is neutralized to 6 pH with concentrated hydrochloric acid. The filter cake is washed on the filter with cold water and dried at room temperature. The dried reaction product contains 7.0% methoxyl group. The calculated degree of methyl ether substitution is 0.33. The product forms a smooth viscous paste in 12 parts of water at 95° C. The water pastes of this product are useful as a binder in paper coating.

*Example 17*

This example illustrates the modification of a corn starch inhibited with dimethylol urea by reacting it with methyl bromide to form a methyl ether. Example 16 is repeated in all details except the 500 grams of starch prepared according to Example 1 is replaced with 500 grams of starch prepared according to Example 3. The dried reaction product contains 7.2% methoxyl group. The calculated degree of methyl ether substitution is 0.34. The product forms a smooth viscous paste in 12 parts of water at 95° C. Its water pastes are useful in paper coating.

*Example 18*

This example illustrates the modification of a corn starch inhibited with divinylsulfone by reacting the inhibited starch with monochloroacetic acid. Example 15 is repeated in all respects except that the 500 grams of starch prepared according to Example 1 are replaced with 500 grams of starch prepared according to Example 6. The dried reaction product contains 3.7% of added acetic acid and the calculated degree of carboxyethyl substitution is 0.13. The product forms a smooth viscous paste in 12 parts of water at 95° C. It has the conventional utility of a gelatinizable starch.

*Example 19*

This example illustrates the modification of an acrolein-inhibited corn starch by reacting it with methyl bromide to form the methyl ether. Example 16 is repeated in all respects except that the 500 grams of starch prepared according to Example 1 is replaced with 500 grams of starch prepared according to Example 7. The dried reaction product contains 7.1% methoxyl group and the calculated degree of substitution is 0.33. The product forms a smooth viscous paste in 12 parts of water at 95° C. Its water pastes are useful in paper coating.

In the foregoing examples, the inhibited starches that are treated with an etherifying reagent to yield starch derivatives illustrating our invention are dried before they are reacted with the etherifying reagent. Such drying is not essential. If the inhibited starch is prepared in a water slurry, the reaction slurry may be treated directly with an appropriate etherifying reagent, or the inhibited starch may be filtered from its reaction slurry, washed with water on the filter, then re-suspended in water for reaction with an appropriate etherifying reagent.

We claim:

The method of preparing starch ethers having (1) the physical form of ungelatinized starch granules, (2) an ether group degree of substitution lying within the range of about 0.15 to about 0.55, (3) a gelatinization temperature lying within the range of about 45° C. to about 95° C., and (4) the property of forming a smooth viscous paste when mixed with 12 parts by weight of water at 95° C. which comprises the following steps in the following order: (*a*) reacting starch granules in an alkaline aqueous slurry under conditions of pH and temperature that preserve the starch in ungelatinized form with about 0.1% to about 0.5% by weight of epichlorohydrin based on the weight of starch until the reaction is substantially complete and the reacted starch granules, after separation from the alkaline fluid reaction medium, swell only slightly in water at 95° C. and settle out on standing from a slurry with 12 parts by weight of water at 95° C., and (*b*) reacting the starch product of step (*a*) with ethylene oxide in an alkaline aqueous slurry under conditions of pH and temperature that preserve the ungelatinized form of the starch product until the ether group degree of substitution in said product lies within the range of about 0.15 to about 0.55, the mole ratio of said etherifying reagent to said starch product in reaction step (*b*) ranging from about 0.32 to about 1.1.

References Cited in the file of this patent

UNITED STATES PATENTS

| | | |
|---|---|---|
| 2,500,950 | Konisberg | Mar. 21, 1950 |
| 2,524,400 | Schorne et al. | Oct. 3, 1950 |
| 2,773,057 | Hjermstad et al. | Dec. 9, 1956 |
| 2,802,000 | Caldwell et al. | Aug. 6, 1957 |
| 2,853,484 | Lolkema et al. | Sept. 23, 1958 |